(12) United States Patent
Mithal et al.

(10) Patent No.: US 8,100,450 B2
(45) Date of Patent: Jan. 24, 2012

(54) FOOD SERVICE TONGS AND MOLD THEREFOR

(75) Inventors: Ashish K Mithal, North Chelmsford, MA (US); William A Gallop, Westminster, MA (US)

(73) Assignee: Waddington North America, Inc., Chelmsford, MA (US)

( * ) Notice: Subject to any disclaimer, the term of this patent is extended or adjusted under 35 U.S.C. 154(b) by 425 days.

(21) Appl. No.: 12/354,812

(22) Filed: Jan. 16, 2009

(65) Prior Publication Data

US 2009/0179442 A1 Jul. 16, 2009

Related U.S. Application Data

(60) Provisional application No. 61/021,384, filed on Jan. 16, 2008.

(51) Int. Cl.
*A47G 21/10* (2006.01)
*B25B 9/02* (2006.01)

(52) U.S. Cl. .................................................. 294/99.2

(58) Field of Classification Search ................ 294/3, 16, 294/99.2; D7/686; 606/210; 30/150
See application file for complete search history.

(56) References Cited

U.S. PATENT DOCUMENTS

| 33,703 | A | | 11/1861 | Hardie | |
|---|---|---|---|---|---|
| 34,098 | A | | 1/1862 | Hardie | |
| D101,764 | S | * | 11/1936 | Brooks | .......................... D7/686 |
| D125,774 | S | | 3/1941 | Madan | |
| 3,306,139 | A | * | 2/1967 | Brackett | ...................... 294/99.2 |
| D235,306 | S | | 6/1975 | Christian et al. | |
| D246,280 | S | | 11/1977 | Daenen | |
| 4,073,533 | A | | 2/1978 | De brey et al. | |
| 4,212,305 | A | * | 7/1980 | Lahay | .......................... 606/210 |
| 4,226,459 | A | * | 10/1980 | Natalicio | ..................... 294/99.2 |
| 4,317,284 | A | | 3/1982 | Prindle | |
| 4,350,445 | A | | 9/1982 | Olsson | |
| 4,524,512 | A | | 6/1985 | Formo et al. | |
| D284,442 | S | | 7/1986 | Chan | |
| 4,707,922 | A | | 11/1987 | Hosak-Robb | |
| 4,728,139 | A | | 3/1988 | Oretti | |
| 4,750,771 | A | * | 6/1988 | Emmett et al. | ................ 294/99.2 |
| D311,851 | S | * | 11/1990 | Allardyce | ....................... D7/642 |
| D318,600 | S | | 7/1991 | Lillelund et al. | |
| 5,156,431 | A | * | 10/1992 | Lowe | .......................... 294/99.2 |
| 5,199,756 | A | | 4/1993 | Bartlett et al. | |
| D357,846 | S | * | 5/1995 | McNaughton | ................. D7/686 |
| D362,160 | S | | 9/1995 | Brabeck et al. | |

(Continued)

FOREIGN PATENT DOCUMENTS

WO 2005030016 A1 4/2005

*Primary Examiner* — Dean Kramer
(74) *Attorney, Agent, or Firm* — Vern Maine & Associates

(57) ABSTRACT

Food service tongs and a mold and method for making them, the tongs having first and second arms connected to a fulcrum end, and first and second grasping ends on the arms disposed in a mutually opposing and spaced-apart relationship and moveable in a common plane to a closed position for grasping food there between, and a transverse bridge disposed proximate to the fulcrum end and extending from the first arm to the second arm, with a longitudinal rib extending from the transverse bridge to the fulcrum end, the flow path through the longitudinal rib section of the mold resulting in reduction or displacement of fault lines caused by abutting flow fronts during mold filling. Articles of the invention can be coated with a thin metallic layer to impart a metal-like appearance to these articles.

20 Claims, 12 Drawing Sheets

U.S. PATENT DOCUMENTS

| | | | |
|---|---|---|---|
| D385,159 S | 10/1997 | Gagnon et al. | |
| 5,983,507 A | 11/1999 | Hirai | |
| 6,056,342 A * | 5/2000 | Chan | 294/99.2 |
| 6,131,977 A | 10/2000 | Sacks et al. | |
| 6,217,092 B1 | 4/2001 | Spicker | |
| D442,835 S | 5/2001 | Kaposi | |
| D463,220 S * | 9/2002 | Yun | D7/642 |
| D473,111 S * | 4/2003 | Kortleven et al. | D7/686 |
| D505,599 S | 5/2005 | Fiedeler et al. | |
| D509,708 S | 9/2005 | Schmidt | |
| 6,983,542 B2 | 1/2006 | Mithal et al. | |
| D530,986 S | 10/2006 | Lago-Arenas | |
| D531,463 S | 11/2006 | Jarvis et al. | |
| D536,222 S | 2/2007 | Heiberg et al. | |
| D579,732 S | 11/2008 | deBretton | |
| D585,246 S | 1/2009 | Miller | |
| 7,913,402 B2 | 3/2011 | Buchtmann et al. | |
| 2005/0028958 A1 | 12/2005 | Schmidt | |
| 2006/0191145 A1 | 8/2006 | Mithal et al. | |
| 2007/0079513 A1 | 4/2007 | Lago-Arenas | |
| 2008/0000092 A1 | 1/2008 | Vanguard | |
| 2009/0126204 A1 | 5/2009 | Wagner et al. | |
| 2010/0236972 A1 | 9/2010 | Aoki et al. | |

* cited by examiner

Prior Art Design "A"

Prior Art Design "B"

Prior Art Design "B"
*(In failure mode)*

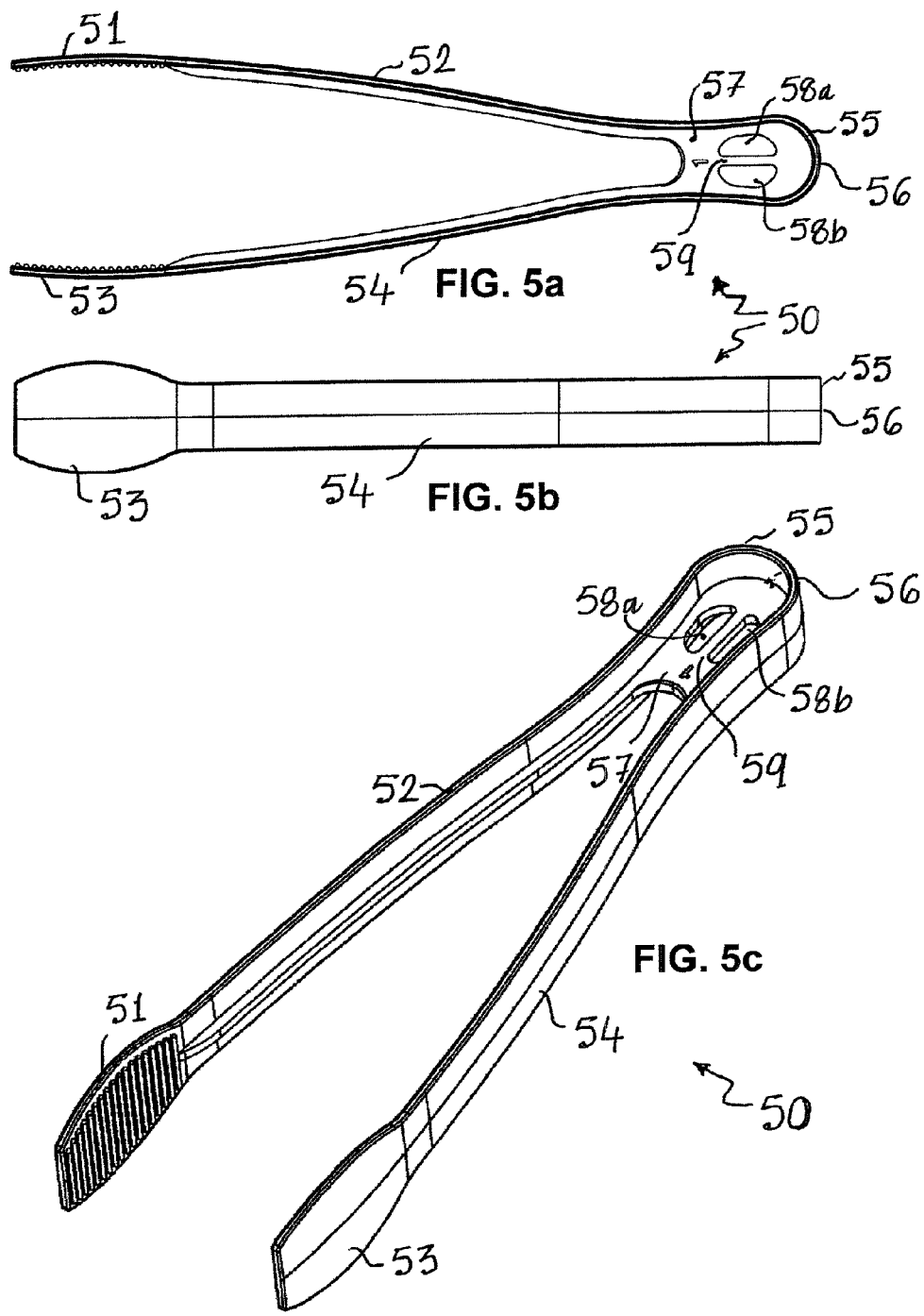

FOOD SERVICE TONGS AND MOLD THEREFOR

RELATED APPLICATIONS

This application relates and claims priority to pending U.S. application 61/021,384, filed Jan. 16, 2008 which is incorporated herein for all purposes.

FIELD OF INVENTION

This invention relates generally to tongs. More particularly, this invention relates to disposable plastic tongs which can be utilized for handling food and a mold therefor.

BACKGROUND OF THE INVENTION

Food handling implements such as tongs find wide-spread use in restaurants, diners, cafeterias and households for serving, grasping and generally handling a variety of food items. A variety of designs of tongs for handling food are known in the art, but generally comprise a pair of similar arms arranged in a mutually-opposing and spaced-apart relationship at one end for grasping food, and joined or connected at the other non-grasping or fulcrum end. The mutually-opposing and spaced-apart ends of the pair of similar tong arms are relatively moveable for grasping food items therebetween by a user single-handedly.

In some other complex designs, which are typically made of metal, the tongs may further include a separate hinge or pivot mechanism at the connected or fulcrum end and an additional spring mechanism for keeping the arms normally biased in a spaced apart relationship and lightly resistant to a closing force such as supplied by the gripping pressure of a user's hand. Other food handling tongs are fashioned in the form of scissors wherein the pivotal connection between the opposing arms is located between the grasping end and the handle end.

Usually in plastic tongs the arms are arranged in a spaced-apart fashion in the as-molded condition at one end, which can then be brought together for grasping food objects by a user's one handed grip. The arms are connected at the other end or fulcrum end. Disposable plastic tongs generally do not include any separate hinge and spring mechanisms and are generally molded from a material having sufficient inherent flexibility and resilience. Although, a multitude of resins can be utilized for making tongs; typical material choices for making disposable tongs include general purpose polystyrene (GPPS), polypropylene (PP), polyethylene terephthalate (PET), and blends of general purpose polystyrene (GPPS) and high-impact polystyrene (HIPS) resins. Typical prior art designs that have also been sold by the assignee of the present invention are shown in FIGS. 1A through 2D.

Tongs according to prior art Design "A" are shown in FIGS. 1A and 1B, wherein like parts bear like reference numerals. Specifically, tongs 10 have two similar arms 12 and 14 which are joined or connected at the fulcrum end 15. The term fulcrum end is used to describe the connected end of the tongs which allows arms 12 and 14 of tongs 10 to function as cooperative levers for grasping food items. The gate area for mold filling is centrally located at the fulcrum end 15 and is indicated by reference numeral 16. The grasping end of arm 12 is indicated by reference numeral 11 and the grasping end of arm 14 is indicated by reference numeral 13. The grasping ends 11 and 13 are mutually-opposed and in the as-molded condition are spaced-apart as shown in FIGS. 1A and 1B. During actual use, arms 12 and 14 are squeezed together whereby grasping ends 11 and 13 are brought in a closed position relative to each other for grasping food items by a user single-handedly. One of the problems with this design is that the tongs tend to fail in the fulcrum region or around the gate area. It would be appreciated by those skilled in the art that when arms 12 and 14 are brought closer together the inner areas in the fulcrum region undergo compressive stresses while the outer areas are subjected to tensile stresses.

Tongs according to prior art Design "B" are shown in FIGS. 2A through 2B, wherein like parts bear like reference numerals. Specifically, tongs 20 have two similar arms 22 and 24 which are joined at the fulcrum end 25. The gate area for mold filling is centrally located and is indicated by reference numeral 26. The grasping end of arm 22 is indicated by reference numeral 21 and the grasping end of arm 24 is indicated by reference numeral 23. The grasping ends 21 and 23 are mutually-opposed and in the as-molded condition are spaced-apart as shown in FIGS. 2A and 2B. Grasping ends 21 and 23 are adapted to be closed relative to each other for grasping food items by a user single-handedly. In addition, a cross-member or bridge 27 is provided between the arms 22 and 24 proximate to the fulcrum end 25. The opening or space created between the fulcrum end 25 and bridge 27 is denoted by reference numeral 28. One of the features of bridge 27 is that it serves to reduce the stresses encountered in the gate region when the tong arms are compressed together during normal use for grasping. However, this design (design "B") also suffers from an inherent disadvantage in that the connecting bridge creates an area of stress concentration and tends to display breakage or failure at the mid-point of the bridge during normal use. The stress concentration is caused by a weld-line that is created during injection-molding of the part when two melt-flow fronts traveling alongside the two opposing arms meet at or about the center of the bridge. The presence of a weld-line (or fault-line) renders the tongs susceptible to breakage in that area.

FIGS. 2C and 2D show tongs 20 in one of the failure modes wherein like parts bear like reference markings. Specifically, FIGS. 2C and 2D show a failed bridge 27 due to stress concentration at the center of the bridge when the tong arms 22 and 24 are brought closer relative to one another. The failure results in the formation of a crack or split on the back edge of the bridge, typically at the weld-line, shown by reference numeral 29. The crack or split is the result of tension on the back edge of the bridge created during compression of arms 22 and 24 for closing respective grasping ends 21 and 23 when in use.

Generally speaking, the failures in tongs depend on a variety of factors including the physical design or construction; the material of construction; the type of food being handled; the weight of the food item to be grasped and lifted; the location where a user squeezes the arms of the tongs while grasping food items; repetitive cycles of compression and release of tong arms; and, the speed with which the two arms are closed together while grasping.

In order to improve the resistance to breakage of the tongs constructed according to the designs discussed above the tongs have been sometimes molded from a resin blend containing general purpose polystyrene (GPPS) and high-impact polystyrene (HIPS). It will be realized by those skilled in the art that a certain combination of flexibility and resilience is required to obtain a functional tongs article; however, it is also the experience of the inventors that incorporating large amounts of HIPS renders the tongs too flexible for use.

Thus, there is a need for improving the strength and breakage-resistance of prior art tongs. There is also a need for improving the failure rate in tongs without utilizing expensive resin blends or materials or resorting to an increase in the weight of tongs by using additional plastic resin. These and other needs as shall hereinafter appear are met by the tongs of the present invention.

BRIEF SUMMARY OF THE INVENTION

An object of the present invention is to overcome the disadvantages of prior tongs and to provide tongs which offer improved strength and resistance to breakage during use and while handling foods.

Still another object of the invention is to minimize structural failures in the connecting tongs bridge area during usage thereof, and particularly reduce or eliminate failures related to inherent fault-lines or weld-lines that originate during mold-filling.

According to an embodiment of the present invention—the prior art design "B" discussed above in conjunction with FIGS. 2A through 2D, is improved upon by providing a longitudinal member that extends from the gate area and connects with the cross-member or bridge 27. The longitudinal member is disposed between the two arms of the tongs and is configured by design to affect both the molding process by altering the nature and position of flow front intersections, and the performance of the molded article, by stiffening the base of the tongs, so as to inhibit failures in that area of the tongs during use. In particular, the longitudinal member is adapted to prevent or at least minimize the formation of central weld-lines in bridge 27 during mold-filling, which render bridge 27 susceptible to failure and crack propagation during use.

According to another embodiment of the present invention there is provided a reinforcing wall extending from the gate area of the tongs and disposed in the plane of the tongs between the arms so as to connect the arms together proximate to the fulcrum end. Thus, the reinforcing wall extends in both longitudinal and transverse directions to cross-connect the side arms of the tongs a short distance from the fulcrum end of the tongs, and is connected directly to the fulcrum end and the gate area of the tongs. The length of the reinforcing wall along the centerline or longitudinal axis of the tongs is less than 40% of overall length of the tongs and preferably less than about 20% of the overall length of the tongs. Since the reinforcing wall extends in both longitudinal and transverse directions from the gate area of the tongs, centerline mold weld-lines or fault-lines characteristic of tongs having bridge members not longitudinally connected to the fulcrum end, are minimized. The reinforcing wall in some embodiments may be characterized as a web-like membrane or a relatively thin, structural component that is in-plane or coplanar to the plane of the tongs. In other embodiments, the reinforcing wall may be in the form of a relatively thin membrane with stiffeners extending in a direction transverse to the plane of the membrane. In still other embodiments, the reinforcing member may comprise a plurality of membrane and stiffening elements.

According to yet another embodiment of the present invention, the reinforcing wall is not completely solid but includes a pair of openings disposed on either side of a central longitudinal member. In a variant of this embodiment the reinforcing wall may include a plurality of paired openings. Thus, a first set of openings can be disposed between the longitudinal member and one side-arm of the tongs and the second set of openings can be disposed between the longitudinal member and another side-arm of the tongs. Although not necessary, it would be desirable for resin-flow-balancing purposes that the openings are symmetrically disposed about the longitudinal member. The longitudinal member can be in the form of a rib or beam. In this construction, the longitudinal member provides a structural feature to improve stiffness of the tongs and also serves as a flow channel during mold filling and thereby effectively eliminates any flow front intersection weld-lines from the central area of the reinforcing wall.

According to still another embodiment of the invention, there is provided a bridge wall between the two arms of the tongs proximate to the fulcrum end wherein the bridge wall extends in a perpendicular direction to the plane of the tongs. The bridge wall is connected to a longitudinal wall which extends from the fulcrum end of the tongs and connects to bridge wall. The longitudinal wall extends in a direction perpendicular to the plane of the tongs and features a pair of openings disposed on either side thereof. In an embodiment of the invention, not to be construed as a limitation, the longitudinal wall is centrally located between the two arms of the tongs and spaced equidistantly therefrom.

Another aspect of the invention is to overcome an additional problem while using tongs in that the handles or arms often come into direct contact with the food being served. This is typically caused by either a user leaving the tongs inside the serving bowl or pan or placing the tongs in a position where they slide into the bowl. Naturally, this presents a rather distasteful task for the next user who must then retrieve the food-laden tongs from the bowl. This problem has been recognized in the prior art and U.S. Pat. No. 6,131,977 ('977) describes a tong assembly comprising tongs and a hand shield. The shield extends substantially 360 degrees around the arms, when the tongs are closed. While '977 provides a solution to the problem of tongs sliding into the food container when propped against its sides; it is not readily adaptable for use with disposable tongs since assembling tongs and shield sections would add substantial cost and complexity.

Accordingly, a feature of the present invention is to provide tongs that can be propped against the sides of a food container and incorporate at least one downwardly-protruding tab or stop proximate to the connected-end of the tongs. The protruding tab(s) are configured to catch on the rim of a food container and prevent or restrain the tongs from sliding into the food container.

Another feature of the present invention is to provide tongs that emulate the appearance of permanent ware tongs.

Another feature of the present invention is to provide tongs that are metallized using a vapor deposition process including sputter deposition.

Another feature of the present invention is to provide tongs that are coated with a steel layer.

Another feature of the present invention is to provide tongs that are coated with a stainless steel layer.

Another feature of the present invention is to provide tongs that are coated with a titanium nitride layer.

Still other objects, features and advantages of the present invention will become readily apparent to those skilled in this art from the following detailed description, wherein we have shown and described some exemplary embodiments of the invention, simply by way of illustration.

BRIEF DESCRIPTION OF THE DRAWINGS

The invention will be better understood upon reading the following Detailed Description in conjunction with the drawings wherein:

FIG. 5A is a top view of tongs according to yet another embodiment of the invention featuring a reinforcing wall with a central rib member and openings provided on either side of the central rib member.

FIG. 5B is a side view of the tongs shown in FIG. 5A.

FIG. 5C is an isometric view of the tongs shown in FIGS. 5A and 5B.

DETAILED DESCRIPTION OF THE INVENTION

The following description of the exemplary embodiment (s) of the invention has been presented—by way of illustration and to facilitate an understanding of the invention by one of ordinary skill. The description and accompanying figures are not meant to be exhaustive and accordingly many modifications and variations are possible in the light of the disclosure. It is not intended to limit the scope of the invention in any way. Furthermore, the features and advantages described herein are not all-inclusive and, in particular, many additional features and advantages will be apparent to one of ordinary skill in the art in view of the drawings, specification, and examples of claims. As will also be realized, the invention is capable of other and different embodiments, and its several details are capable of modifications in various respects without departing from the spirit and scope of the invention. Also, it will be appreciated that the reference numbers used with respect to specific areas of the illustrated structures may also be interpreted as referring to the related area or cavity section of the mold, not shown but readily understood by those skilled in the art, by which the structure is formed, wherever the context so admits.

Figure 3A:
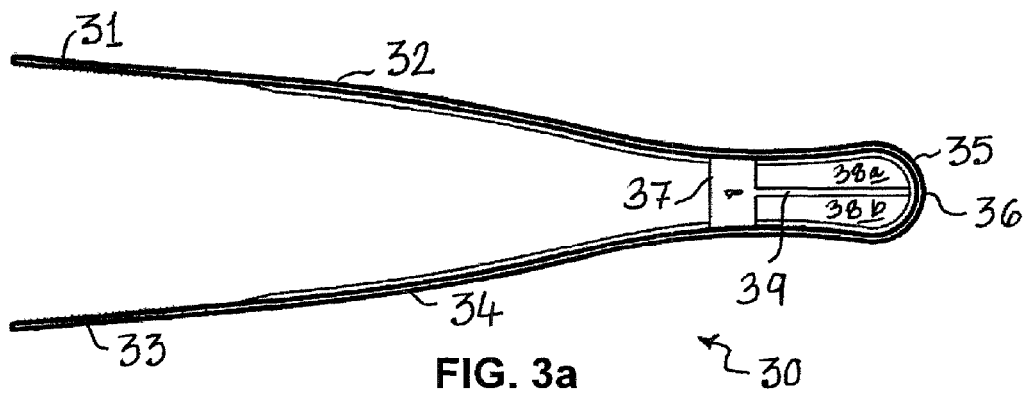
FIG. 3A is a top view of tongs according to an embodiment of the invention featuring a longitudinal rib.
Figure 3B:
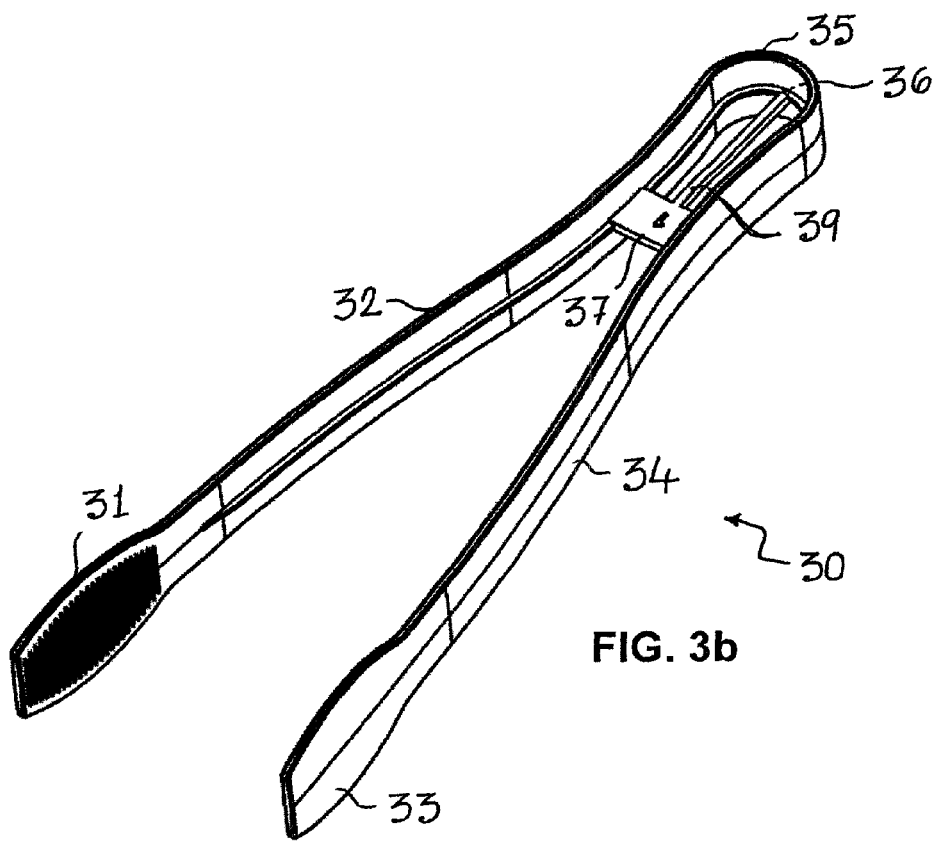
FIG. 3B is an isometric view of the tongs shown in FIG. 3A.
Figure 8:
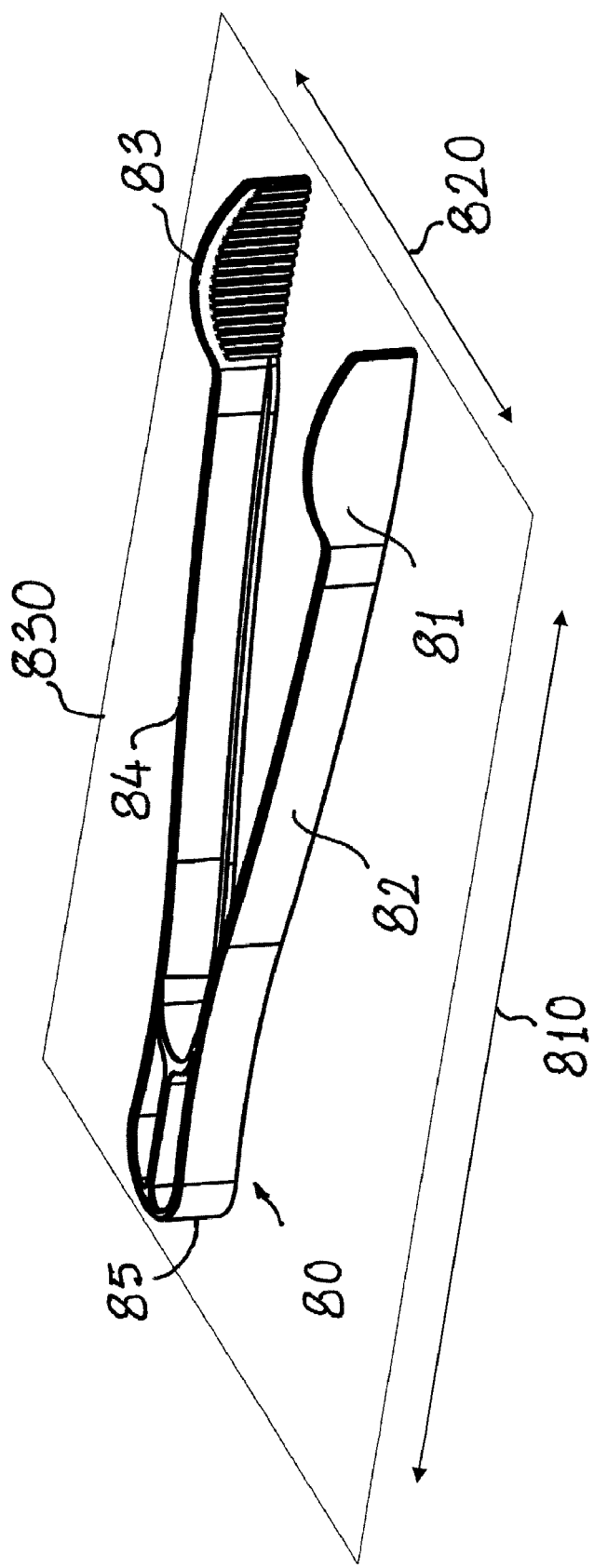
FIG. 8 is a truncated isometric view of tongs according to an embodiment of the invention particularly showing the plane of the tongs with longitudinal and transverse directions indicated.

Referring to FIGS. 3A and 3B there is featured an exemplary embodiment of the present invention showing tongs 30 wherein like parts bear like reference markings. Tongs 30 includes a pair of similar arms 32 and 34 which are joined together at the fulcrum end 35 and feature a centrally located gate area 36. Fulcrum end 35 is of a generally arcuate shape so that arms 32 and 34 terminate in a general arc. It would be appreciated by those of ordinary skill that a sharp junction of the arms may result in undue stresses during use. Tongs 30 also includes two grasping ends denoted by reference numerals 31 and 33. Grasping ends 31 and 33 are disposed in a mutually-opposing and spaced-apart or open relationship as initially molded to allow a user to squeeze arms 32 and 34 and relatively close grasping ends 31 and 33 for gripping articles or materials of interest including but not limited to food items. The tongs are generally symmetrical in their major plane, the plane of motion in which the arms move relative to one another about a transverse axis, as is evident in FIG. 3A. The major plane of the tongs has also been simply referred to as the plane of the tongs in this description. (The plane of the tongs is also shown in FIG. 8 and will also be readily understood upon examining FIG. 8 in conjunction with its description.

A transverse member or bridge 37 is provided proximate to the fulcrum end 35. Bridge 37 provides a secondary connection between the two arms 32 and 34. A longitudinal member or rib 39 connects the mid-section of bridge 37 to the gate area 36 at the fulcrum end 35. The longitudinal rib 39 lies on the centerline of the plane of the tongs and defines two openings on either side thereof. Opening 38a is disposed between arm 32, bridge 37 and rib 39, while opening 38b is disposed between arm 34, bridge 37 and rib 39.

Figure 1A:
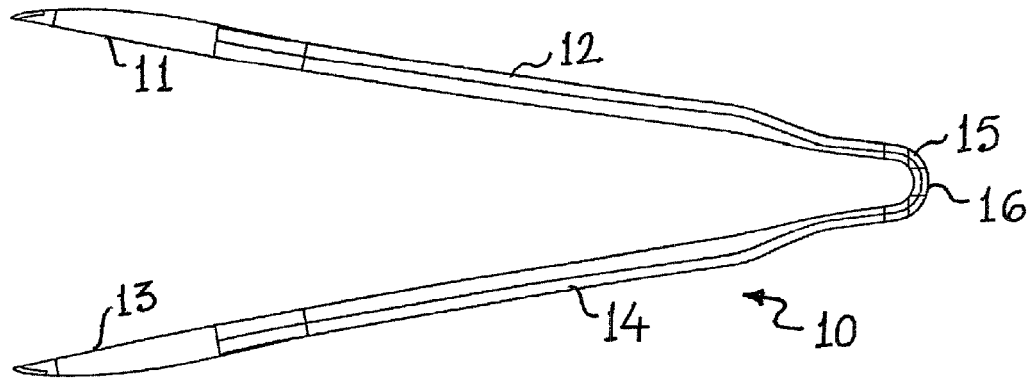
FIG. 1A is a top view of "Design A" prior art tongs.
Figure 1B:
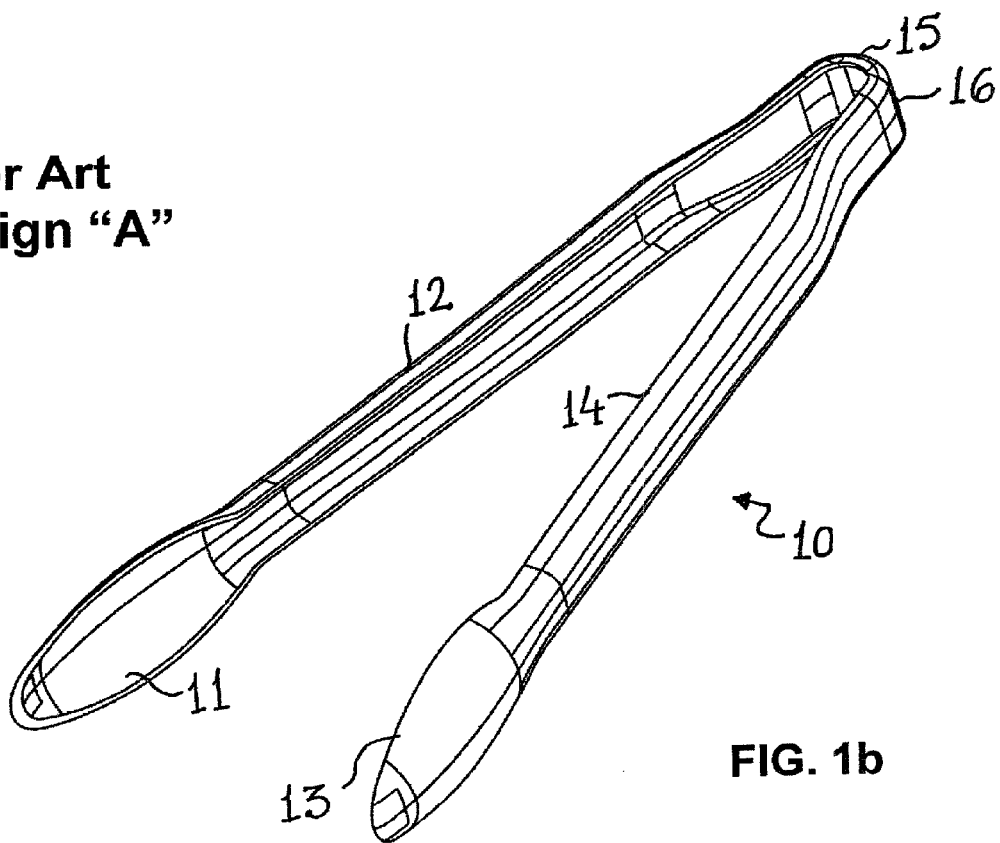
FIG. 1B is an isometric view of "Design A" prior art tongs.
Figure 2A:
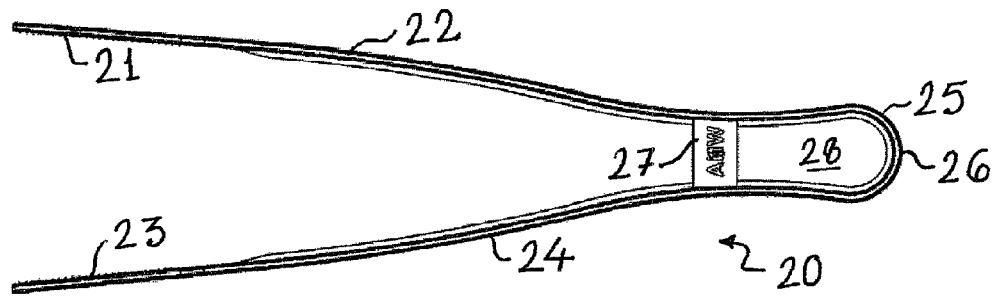
FIG. 2A is a top view of "Design B" prior art tongs.
Figure 2B:
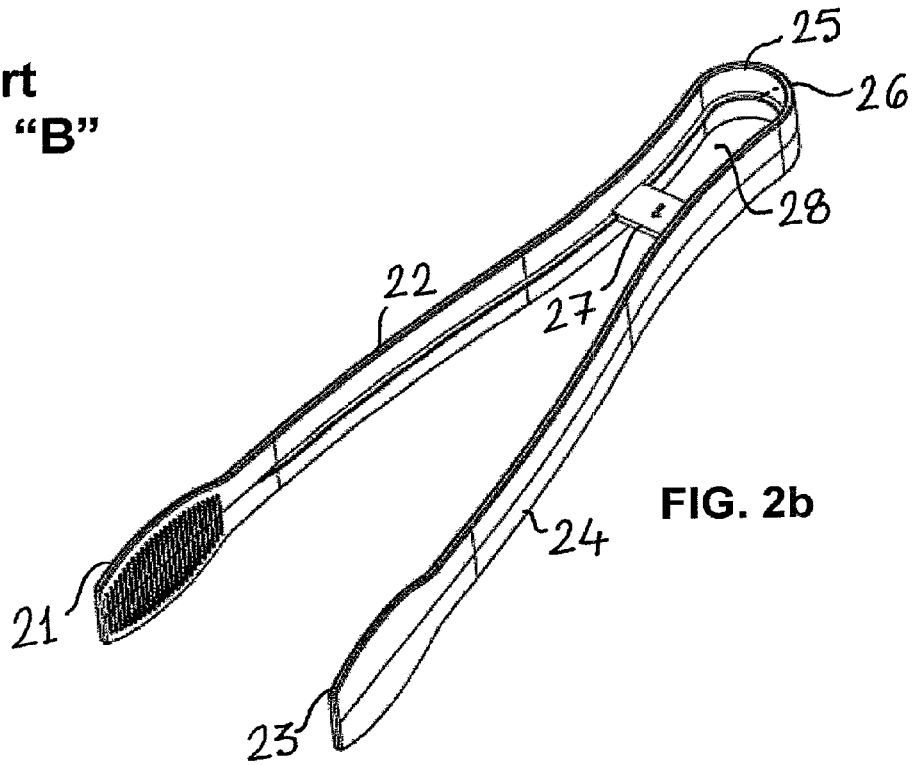
FIG. 2B is an isometric view of "Design B" prior art tongs.
Figure 2C:
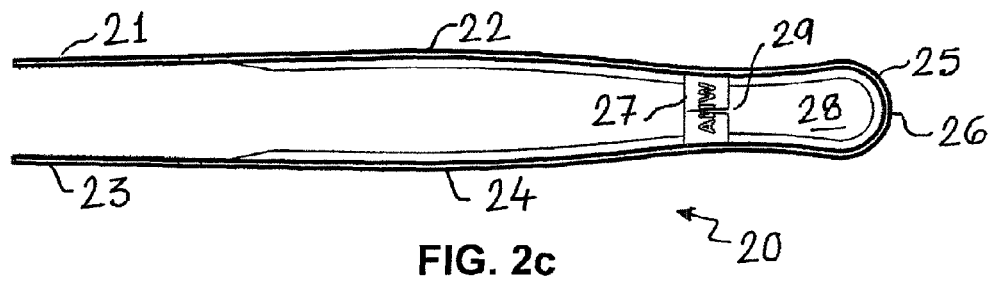
FIG. 2C is a top view of "Design B" prior art tongs in a failure mode.
Figure 2D:
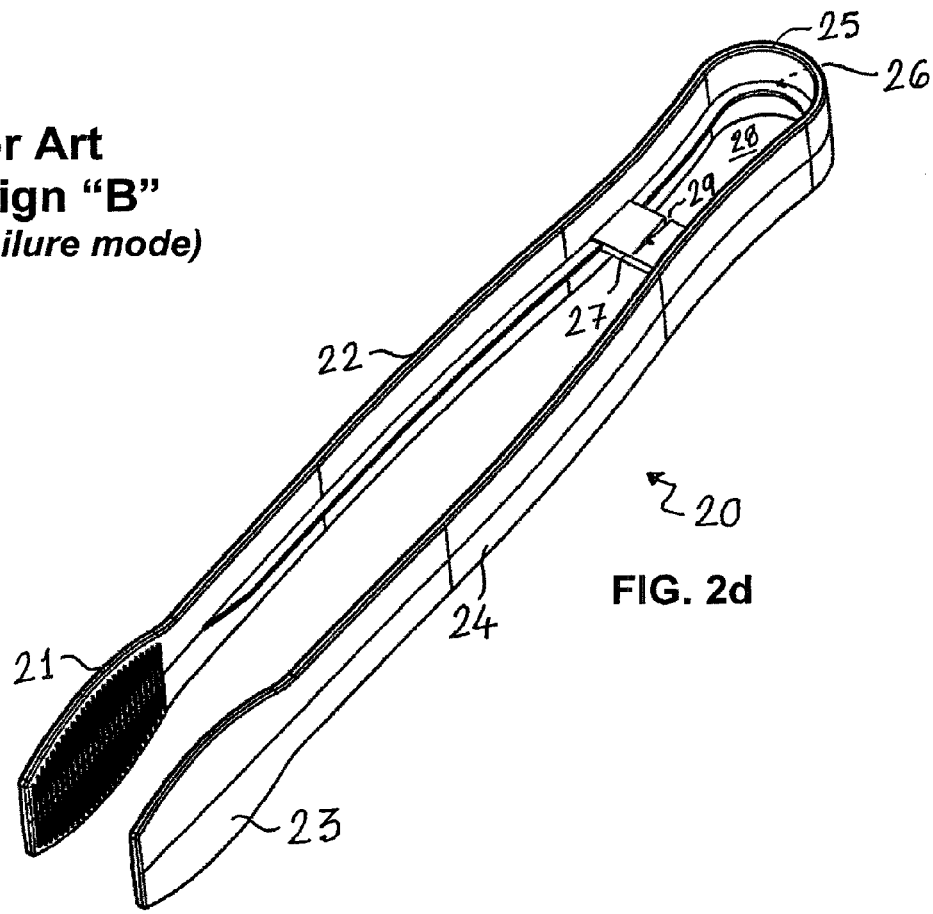
FIG. 2D is an isometric view of "Design B" prior art tongs in a failure mode.

It will be appreciated by those of ordinary skill that, in absence of longitudinal rib 39, bridge 37 will tend to feature a weld-line at its center as the resin flow-fronts traveling along corresponding mold sections represented by arms 32 and 34 respectively during mold filling, merge as intersecting or abutting flow-fronts to form a weld-line in the central region of the bridge 37 cavity, thereby creating an area of stress concentration in bridge 37, proximate the centerline, which is susceptible to failure as shown and discussed earlier with respect to corresponding parts in FIGS. 2C and 2D.

Introducing longitudinal rib 39 displaces any fault or weld-lines susceptible of failing in tension away from the central area of high stresses, because the central section of bridge 37 can be filled with resin directly through rib 39. The mold cavity area representing rib 39 acts as a singular or primary flow path or pathway from the mold gate to the central section of the bridge portion of the mold cavity, linear in this example although it may be non-linear as well. This flow path provided by longitudinal rib 39 in the mold avoids the introduction of a polarized weld line or potential fault line at that critical point by allowing the central section of bridge 37 to be filled directly from the mold gate thereby avoiding. Displacing or altering the character of the weld lines in the central section of the bridge enhances the overall reliability of the tongs during food handling. In addition to providing ease of mold filling and eliminating weld lines the longitudinal rib also acts as a structural reinforcement between the bridge 37 and fulcrum end 35, allowing the article to withstand higher stresses.

Figure 4A:
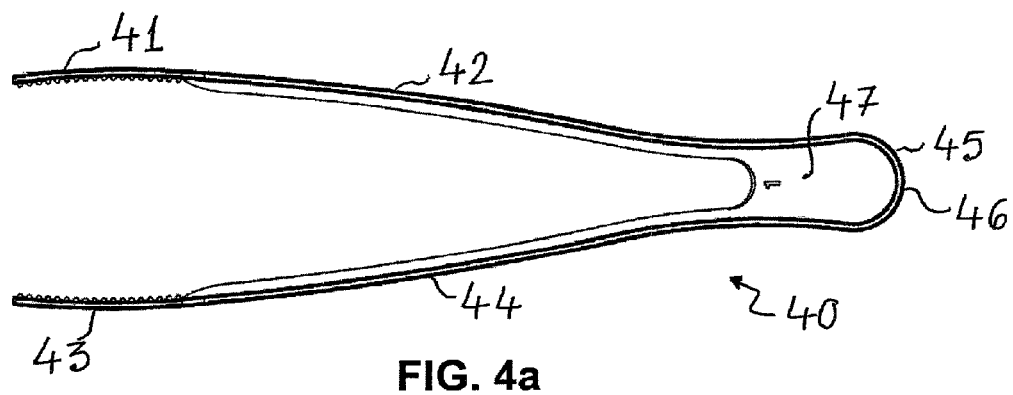
FIG. 4A is a top view of tongs according to another embodiment of the invention featuring a reinforcing membrane that extends from the fulcrum end of the tongs.
Figure 4B:
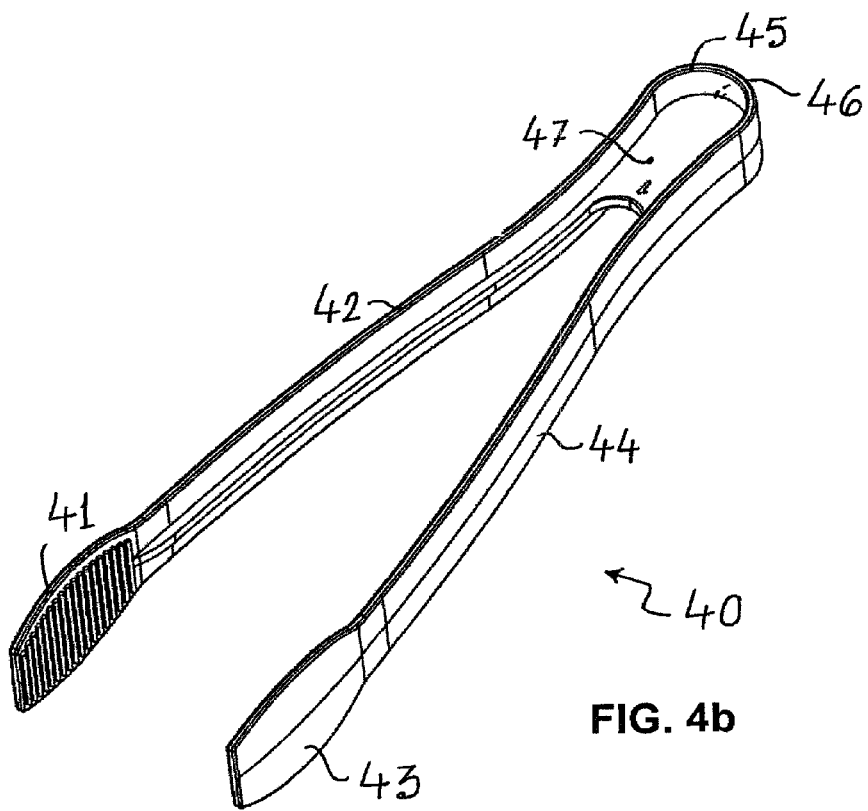
FIG. 4B is an isometric view of the tongs shown in FIG. 4A.

FIGS. 4A and 4B show another embodiment of the present invention showing tongs 40 wherein like parts bear like reference markings. Tongs 40 includes a pair of similar arms 42 and 44 which are joined together at the arcuate fulcrum end 45. A centrally located gate area 46 is provided in the fulcrum end 45 to facilitate mold-filling during injection molding. Tongs 40 also include two grasping ends denoted by reference numerals 41 and 43. Grasping ends 41 and 43 are disposed in a mutually-opposing and spaced-apart or open relationship as initially molded to allow a user to squeeze arms 42 and 44 and relatively close grasping ends 41 and 43 for handling and holding food items.

Tongs 40 also features a reinforcing wall 47, here illustrated as a membrane, meaning in this context a rigid or semi-rigid structural component of the molded article that is relatively thin in one dimension, which extends from the gate 46 in arcuate fulcrum end 45 and extends partially along the length of tongs 40 and thereby connects arms 42 and 44. The reinforcing wall extends along the longitudinal axis of tongs 40 for a distance of less than 40% and preferably less than 20% of overall length of tongs 40. As shown herein, the reinforcing wall 47 is disposed in the major plane of the tongs or the plane of the closing motion of arms 42 and 44, generally perpendicular to the plane of arms 42 and 44. It is also connected to the gate area 46, all as shown in FIGS. 4A and 4B.

It will be realized by those skilled in the art that reinforcing wall 47 would tend to be considerably stiffer than bridge 27 of the prior art design shown in FIGS. 2A through 2D. In addition, with the reinforcing membrane design sharp weld-lines or fault-lines created by abutting flow-fronts at centerlines are naturally avoided. Therefore, other things being equal, tongs 40 would show reduced incidence of failures proximate to the fulcrum end 45 or at the reinforcing wall 47. It will also be appreciated by those skilled in the art reinforcing wall 47 tends to provide additional structural stiffness and resiliency to arms 42 and 44 so that food objects can be readily and effectively grasped and handled thereby further enhancing the functionality of the tongs article.

To further improve the performance of prior art design which is shown in FIGS. 2A through 2D grasping ends 41 and 43 of tongs 40 are shown biased inwardly to effect better gripping of food objects without excessive squeezing of arms of 42 and 44.

It was recognized that the benefits of reinforcing wall 47 shown in FIGS. 4A and 4B, can be maintained even when the membrane is not completely solid but includes strategically placed openings. Additional embodiments of the invention featuring reinforcing membrane with a pair of openings are shown FIGS. 5A through 7.

Now referring to FIG. 5A through 5C there is shown yet another embodiment of the present invention in the form of tongs 50. Tongs 50 includes a pair of similar arms 52 and 54 which are joined together at the arcuate fulcrum end 55. A centrally located gate area 56 is provided in the fulcrum end 55 to facilitate mold-filling during injection molding. Tongs 50 also includes two grasping ends denoted by reference numerals 51 and 53. Grasping ends 51 and 53 are disposed in a mutually-opposing and spaced-apart or open relationship as initially molded to allow a user to squeeze arms 52 and 54 and relatively close grasping ends 51 and 53 for handling and holding food items. Once again, grasping ends 51 and 53 are shown biased inwardly to provide a better grasping and holding functionality to the tongs article without excessive squeezing of the tongs arms 52 and 54.

Tongs 50 also features a reinforcing wall 57 which extends from the arcuate fulcrum end 55 and connects arms 52 and 54 over a portion of their length. The reinforcing membrane extends along the longitudinal axis of tongs 50 for a distance of less than 40% and preferably less than 20% of overall length of tongs 50. The reinforcing wall 57 is disposed in the plane of the tongs generally perpendicular to the plane of arms 52 and 54. It also connects to the gate area 56 as shown in FIGS. 5A and 5C. Reinforcing wall 57 also includes a pair of openings 58a and 58b which are disposed on either side of the centerline of member 57, so as to retain a centrally located beam or rib 59 along the centerline of the tongs from fulcrum end 55 into the solid area of the membrane. These openings may provide a decorative effect and reduce material requirements.

Figure 5D:
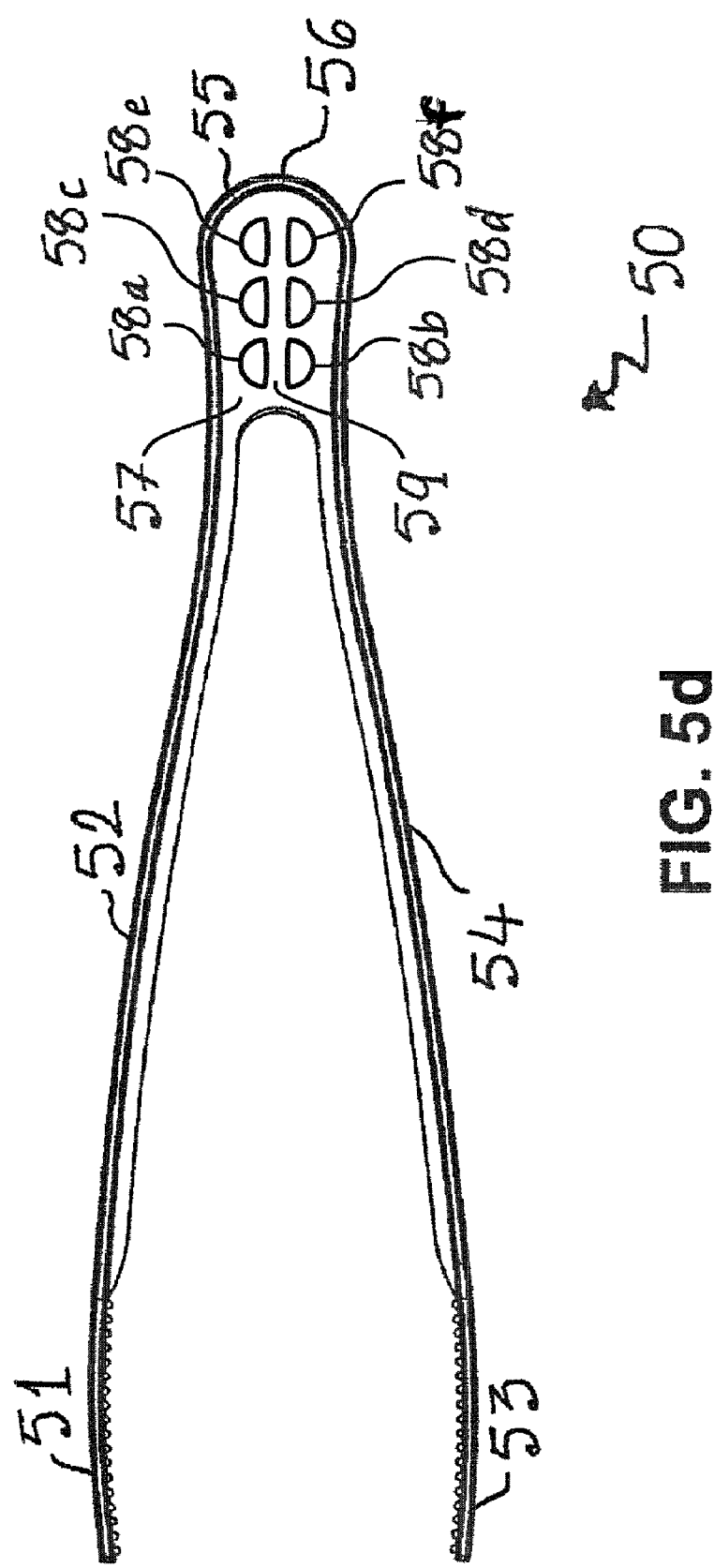
FIG. 5d is a top view of tongs according to yet another embodiment of the invention featuring a reinforcing wall with a central rib member and a plurality of openings provided on either side of the central rib member.

It will be realized by those skilled in the art that rib 59 serves to facilitate resin flow through the reinforcing wall 57 during mold filling, which serves to avoid creation of intersecting flow-fronts along the centerline of the membrane or wall structure. With reference to FIG. 5d, it will also be recognized that additional openings 58a, 58b, 58c, 58d, 58e, 58f, such as may be provided for further decorative effect, can be accommodated in the reinforcing wall 57. However, in order to avoid fault lines and weld lines along the centerline of the tongs it is recommended that the openings 58a, 58b, 58c, 58d, 58e, 58f, are disposed in symmetrical pairs on either side of central rib 59, as is illustrated in FIG. 5d.

Figure 6A:
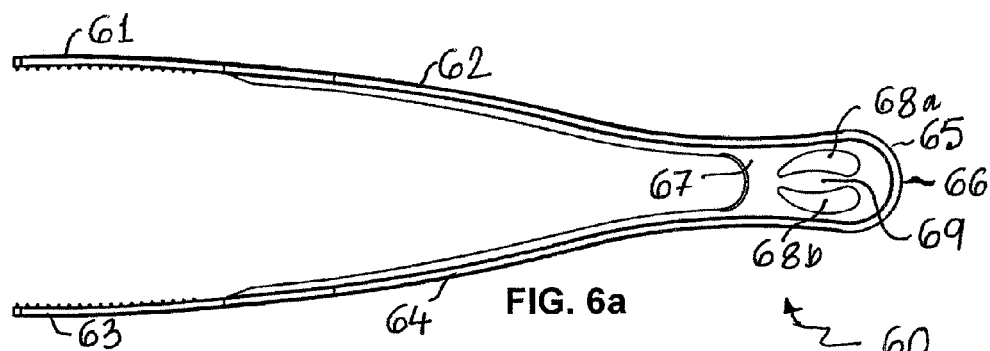
FIG. 6A is a top view according to another embodiment of the invention featuring a reinforcing wall with a central rib member and openings provided on either side of the central rib member.
Figure 6B:
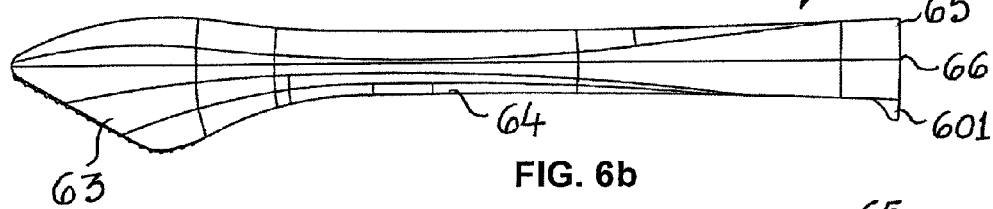
FIG. 6B is a side view of the tongs shown in FIG. 6A and particularly showing a downwardly protruding tab.
Figure 6C:
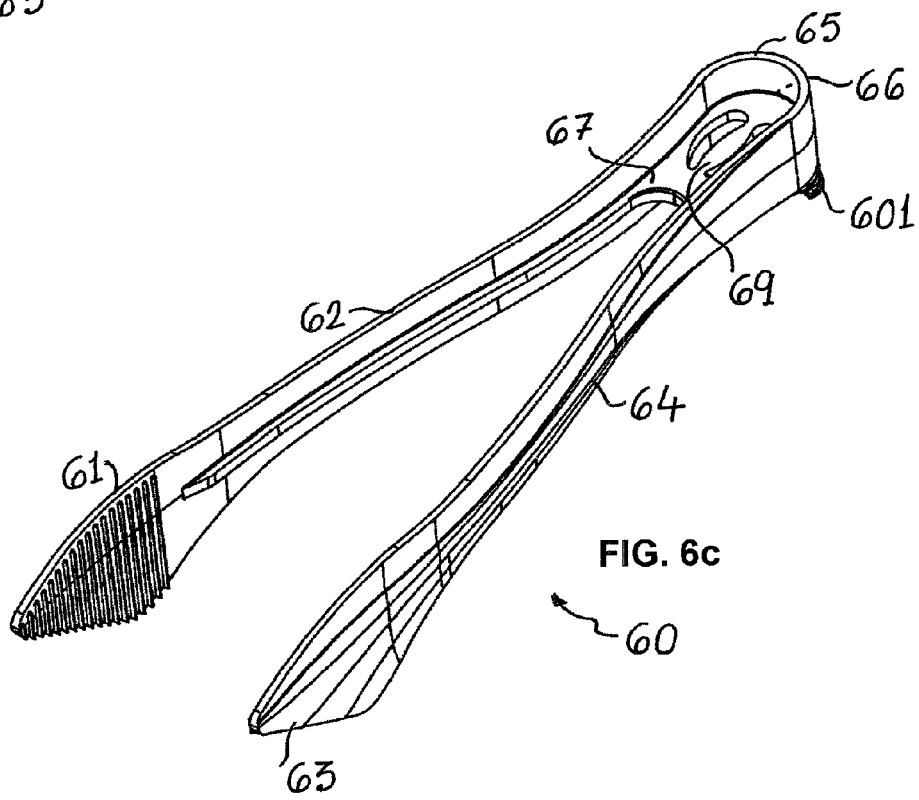
FIG. 6C is an isometric view of the tongs shown in FIGS. 6A and 6B.

Another exemplary embodiment of the invention is shown in FIG. 6A through 6C showing tongs 60. Tongs 60 includes a pair of similar arms 62 and 64 which are joined together at the arcuate fulcrum end 65. A centrally located gate area 66 is provided in the fulcrum end 65 to facilitate mold-filling during injection molding. Tongs 60 also includes two grasping ends denoted by reference numerals 61 and 63. Grasping ends 61 and 63 are disposed in a mutually-opposing and spaced-apart or open relationship as initially molded to allow a user to squeeze arms 62 and 64 and relatively close grasping ends 61 and 63 for handling and holding food items. Once again, grasping ends 61 and 63 are shown biased inwardly towards each other to provide better grasping and holding functionality to the tongs article without excessive squeezing of the arms 62 and 64.

Tongs 60 also features a reinforcing wall 67 which extends from the arcuate fulcrum end 65 and connects to arms 62 and 64 over a portion of their length. The reinforcing wall extends along the longitudinal axis of tongs 60 for a distance of less than 40% and preferably less than 20% of overall length of tongs 60. The reinforcing wall 67 lies in a plane generally perpendicular to arms 62 and 64, and also connects to the gate area 66 as shown in FIGS. 6A and 6C. Reinforcing wall also includes a pair of symmetrical openings 68a and 68b which are disposed on either side of a centrally located beam 69.

It will be realized by those skilled in the art that beam 69 serves to facilitate resin flow through the reinforcing wall 67 during mold filling and serves to avoid creation of fault lines or weld lines in the wall structure, particularly along the centerline. It will also be recognized that while this exemplary embodiment shows a single pair of symmetrical openings additional openings can be accommodated in the reinforcing wall. However, in order to avoid fault lines and weld lines it is recommended that the openings are disposed in symmetrical pairs on either side of central beam 69.

Tongs 60 also includes an anti-sliding or prop feature so that the tongs can be propped against the sides of a food container at an angle without sliding into the food container. The anti-sliding or prop feature is in the form of a downwardly protruding tab 601 provided in the arcuate fulcrum end 65, extending perpendicular to the major plane of the tongs, that will engage the edge or lip of the food container so as to prevent or inhibit the tongs from sliding into the container. Protruding tab 601 can be arcuate in shape to match the profile of the arcuate fulcrum end 65, while presenting a suitably shaped lip or edge with which to engage the edge of the food container. Other embodiments, not shown, may have a similar tab on the opposite side of fulcrum end 65, so that the tongs may be placed on either side in the container, with the same effect.

Figure 7:
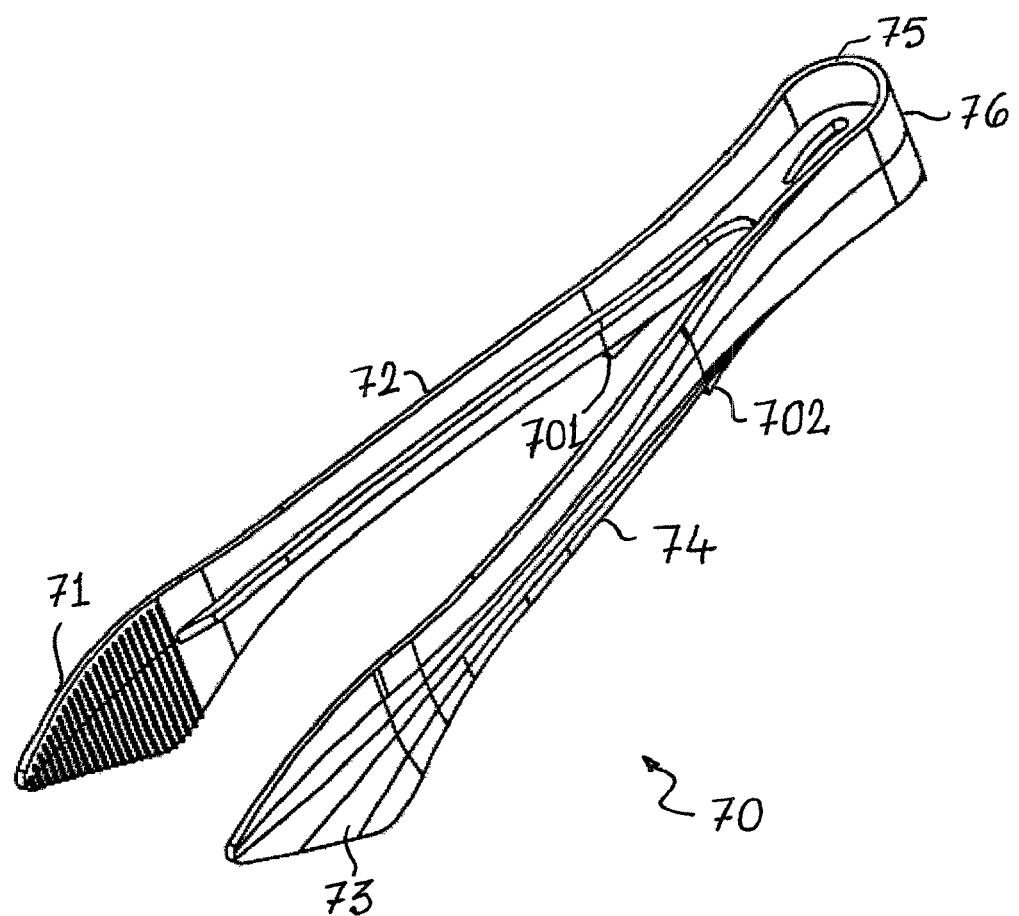
FIG. 7 is an isometric view according to still another embodiment of the invention featuring a pair of protruding tabs on the underside of the two arms of the tongs (i.e. each arm featuring a protruding tab).

It will be appreciated by those of ordinary skill that depending on the size of the tongs article a pair of prop features or protruding tabs functionally equivalent to the tab 601 above can also be placed on the underside or both sides of the tong arms. FIG. 7 demonstrates such an embodiment wherein tongs 70 includes a pair of protruding tabs 701 and 702 provided on the underside of arms 72 and 74 respectively. Protruding tab 701 is located between the grasping end 71 and fulcrum end 75, while protruding tab 702 is located between the grasping end 73 and fulcrum end 75. Protruding tabs 701 and 702 are adapted for preventing tongs 70 from sliding into the food container and serve as props when resting the tongs against the sides of a food container.

FIG. 8 shows another embodiment of the invention displaying a truncated view of tongs 80. Tongs 80 comprise a pair of arms 82 and 84 and are connected at the fulcrum end 85. Arms 82 and 84 feature grasping ends 81 and 83. The reference plane or major plane of tongs 80 is indicated by reference numeral 830. Major plane 830, is the common plane intersecting arms 82 and 84, grasping ends 81 and 83 and fulcrum end 85. The longitudinal direction is indicated by reference numeral 810 and the transverse direction is indicated by reference numeral 820. Arms 82 and 84 and the respective grasping ends 81 and 83, are moveable in the transverse direction 820 between normally open and fully closed positions in the major plane 830.

Figure 9A:
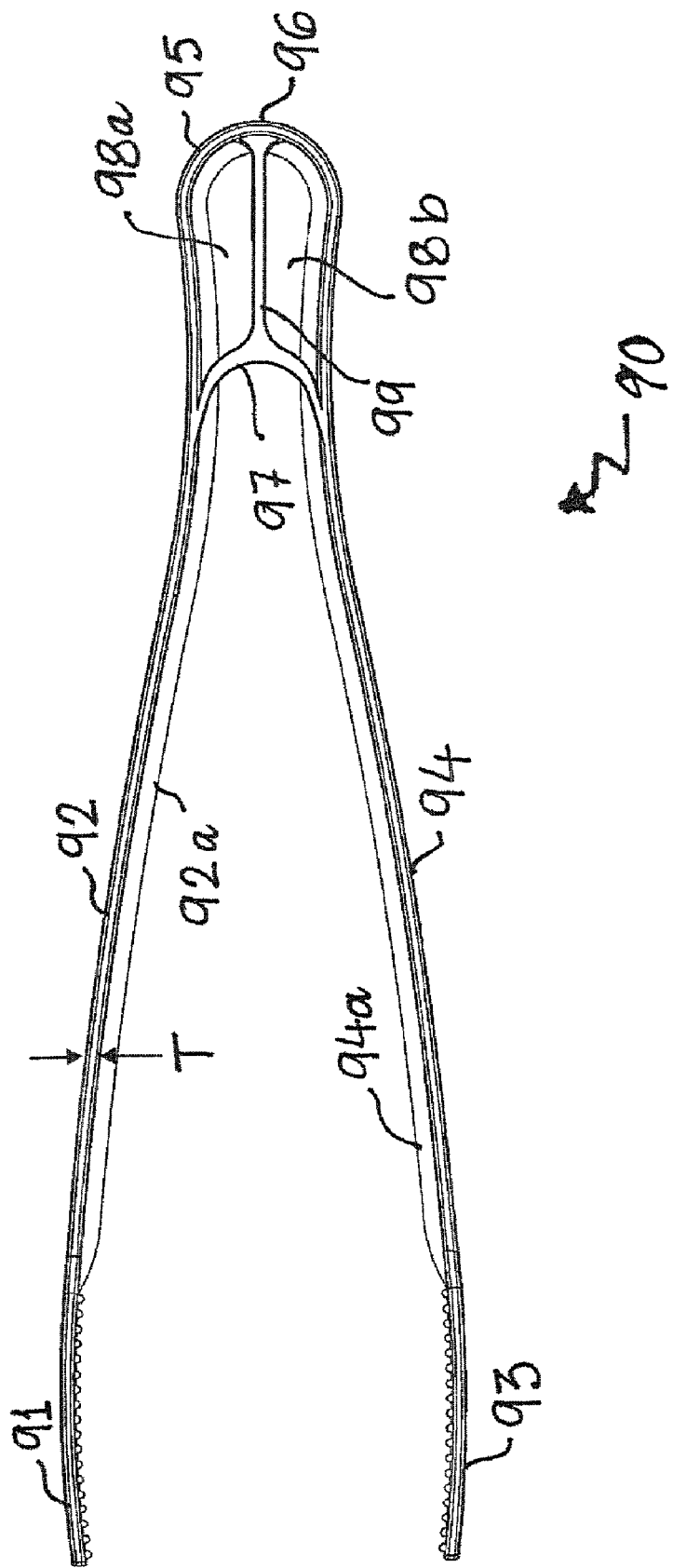
FIG. 9A is a top view according to another embodiment of the invention featuring a bridge wall connecting the two arms of the tongs and a longitudinal wall connecting the fulcrum end of the tongs and the bridge wall.
Figure 9B:
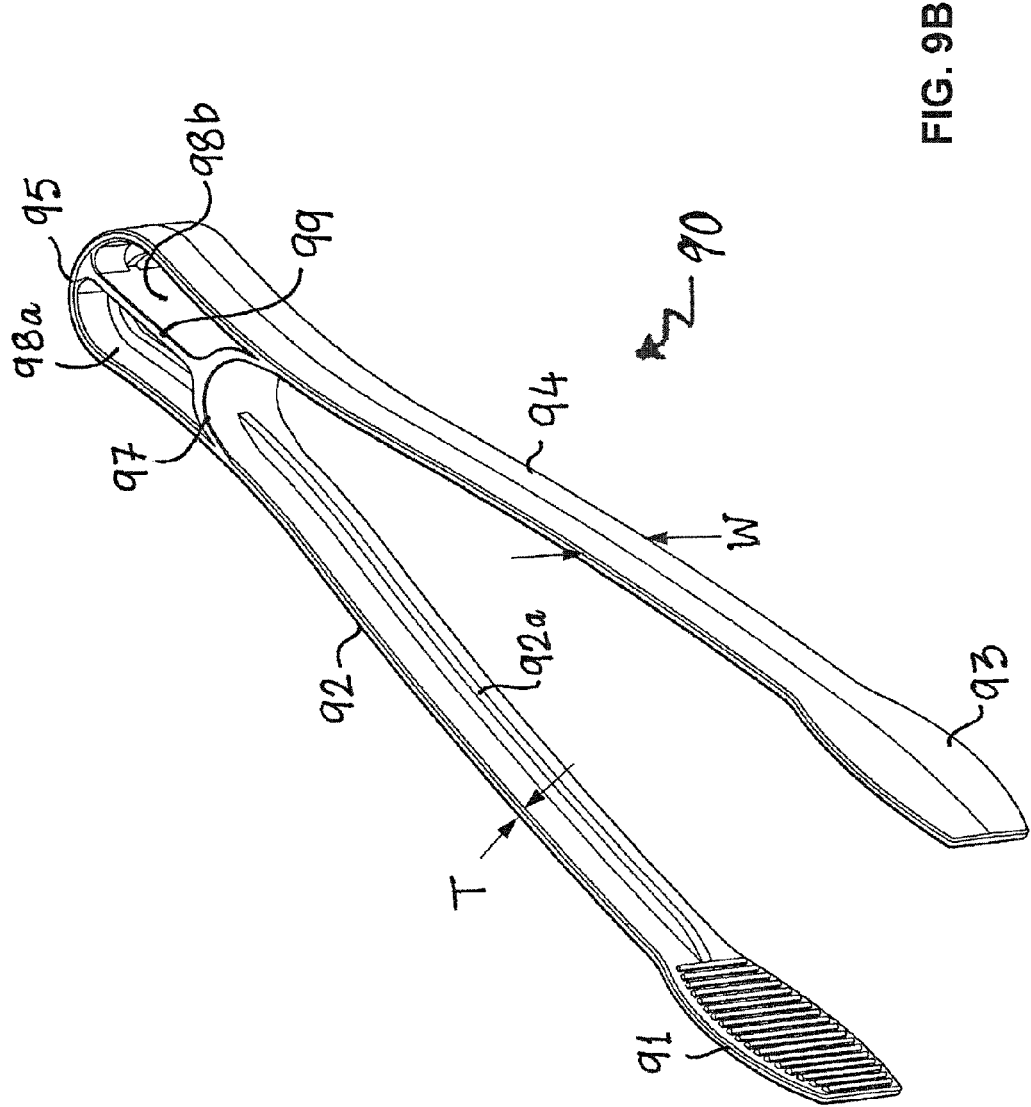
FIG. 9B is an isometric view of the tongs shown in FIG. 9A.

Another exemplary embodiment of the invention is shown in FIGS. 9A and 9B showing tongs 90. Tongs 90 includes a pair of similar arms 92 and 94 which are joined together at the arcuate fulcrum end 95. Arms 92 and 94 and fulcrum end 95 have a significant width "W", greater than their average thickness "T". Width "W" extends perpendicular to the plane of the tongs and may typically range from about ½ inch to about 2 inches or more. It will be readily apparent that particular width or thickness dimensions or ranges of dimensions for arms 92 and 94 are not intended as a limitation.

A centrally located gate area 96 is provided in the fulcrum end 95 to facilitate mold-filling during injection molding. Tongs 90 also includes two grasping ends denoted by reference numerals 91 and 93. Grasping ends 91 and 93 are disposed in a mutually-opposing and spaced-apart or open relationship as initially molded to allow a user to squeeze arms 92 and 94 and relatively close grasping ends 91 and 93 for handling and holding food items. Once again, grasping ends 91 and 93 are shown biased or curved slightly inwardly towards each other to provide better grasping and holding functionality to the tongs article without excessive squeezing of the arms 92 and 94. Arms 92 and 94 are further configured with respective reinforcing ribs 92a and 94a, extending from fulcrum end 95 to but not onto grasping ends 91 and 93. Grasping ends 91 and 93 are somewhat wider than arms 92 and 94 in this embodiment, although they may be of equal width or narrower or much wider in other embodiments. Thus, the relative proportions of the grasping ends and the arms, and mutually relative proportions of other features or dimensional characteristics thereof in any of the embodiments discussed herein, are to be regarded as illustrative and not to be construed as limiting, unless expressly stated as such.

A transverse member or bridge wall 97, also of width W in this embodiment, although it may be more or less wide in other embodiments, is provided proximate to the fulcrum end 95. Bridge wall 97 provides a secondary connection between the two arms 92 and 94. In the exemplary embodiment shown herein, not to be construed as a limitation, bridge wall 97 is arcuate, more or less following the curvature of fulcrum end 95 although other forms and shapes are possible. A longitudinal wall 99, also of width W in this embodiment, although it may be more or less wide in other embodiments, connects the mid-section of bridge wall 97 to the fulcrum end 95. The longitudinal wall 99 is disposed on the centerline of the tongs in this embodiment, although it may vary in shape and placement in other embodiments. A pair of openings 98a and 98b is provided on either side of longitudinal wall 99.

It will be realized by those skilled in the art that longitudinal wall 99 serves to facilitate resin flow through the bridge wall 97 during mold filling and serves to avoid creation of fault lines or weld lines in the bridge wall structure, particularly along the centerline. It will also be recognized that while this exemplary embodiment shows a single pair of symmetrical openings additional openings can be accommodated by incorporating other transverse walls.

According to still another embodiment of the invention tongs of the present invention are adapted to emulate a real silverware tong by incorporating a metallic layer of a suitable metal on the surface of the tongs. Articles having a thin metallic coating are described in U.S. Pat. No. 6,983,542 the teachings of which are incorporated by reference herein for all purposes.

According to another embodiment of the invention the tongs of the present invention are subjected to physical vapor deposition in a sputtering chamber, wherein the parts can be metallized with a thin stainless steel coating.

According to another embodiment of the invention the tongs of the present invention can be metalized with Titanium Nitride coating for imparting a gold color to these articles.

Many more modifications and variations are possible in light of this disclosure without departing from the spirit and scope of the invention. For example, according to another embodiment of the invention there is provided a molded article in the form of tongs for handling food, where the article has a common fulcrum end, and first and second arms extend from the fulcrum end and terminate in respective first and second grasping ends. The first and second grasping ends are disposed in a mutually opposing and normally spaced-apart relationship, and are relatively moveable in a transverse direction in a major plane defined by the arms of the article, referred to as the common plane of the article or simply the plane of the article, to a closed position for grasping food therebetween. There is a reinforcing wall or member disposed between the first and second arms proximate the fulcrum end, which is connected by a transverse component of the wall or member to the first and second arms and by a longitudinal component of the wall or member to the fulcrum end.

The reinforcing wall or member may extend from the fulcrum end to the first and second arms with a continuous line of connection of mold interior space and molten fluid flow continuity during molding, between the reinforcing wall or member and each arm, extending for ten percent or more of the length of the molded article. The reinforcing wall or member may have or include a longitudinal rib extending along the centerline to the fulcrum end, with one or a plurality of openings disposed on each side of the rib.

In another embodiment of the invention, there is provided a tab protruding from the fulcrum end, which may or may not be oriented perpendicular to the plane of the tongs, but which is configured for catching the rim of an open top container when the tongs are positioned with grasping ends in the container, leaning against the rim, so as to prevent the tongs from sliding into the container. There may be another tab on the opposite side of the tongs. Alternatively or in addition, the first and second arms may have one or more similar tabs on one side or both sides for the same purpose.

Any such article may have a thin metallic coating deposited on it by a vacuum deposition process, where the thin metallic coating is of sufficient thickness to impart a reflective, metal-like appearance to the molded article. In some instances, the metallic coating may be steel, stainless steel, or titanium nitride, although other metals and metal alloys suitable for contact with food are within the scope of the invention.

In yet another embodiment of the invention, there is provided a mold (not shown) for making a molded article in the form of food tongs for manual food handling. The mold may comprise two mold halves that when brought together, form a mold cavity with a mold gate; a fulcrum end section into which molten material may be injected through the mold gate; passageways for first and second arms extending from the fulcrum end section and terminating in respective first and second grasping end sections that are disposed in a mutually opposing and normally spaced-apart relationship where the passageways define a plane of the mold; and a reinforcing wall or member section disposed between the first and second arms passageways proximate the fulcrum end section. The reinforcing wall or member section includes a transverse component connecting for fluid flow the first and second arms passageways, and a longitudinal component connecting for fluid flow to the fulcrum end section, thereby providing a direct molten fluid flow path between the mold gate, through the fulcrum end section, and the reinforcing member section.

The reinforcing wall or member section may be in the form of a planar membrane parallel to the reference plane, or in the form of or include a beam-like cavity section. It may or may not have a continuous line or channel of fluid flow connection extending from one arm passageway to the fulcrum end section and on to the other arm passageway. A reinforcing wall or member section in the form of a planar cavity section may be parallel or co-planar to the plane of the article. A reinforcing wall or member section may be in the form of or include a beam-like cavity section that may have a beam height oriented perpendicular to the plane of the article, and which may be more or less equal to the width of the arms.

The reinforcing wall or member section may include a transverse bridge section with fluid flow connection to the arms passageways, and a longitudinal rib section with fluid flow connection to the fulcrum end section. The mold may include at least one tab section protruding from one or both arms and/or the fulcrum section, configured for molding one or more integral tabs into the molded article for catching the rim of an open top container when the article is positioned there.

And still yet another embodiment of the invention includes a method for molding an article in the form of food tongs for manually handling food, which includes the steps: using a mold such as described above; and injecting molten material through the mold gate and hence through the fulcrum end section of the mold, through the direct flow path, and into the reinforcing member section as well as from the fulcrum end into the passageways, so that flow fronts meet at places other than the centerline of the tongs.

The foregoing drawings and description are to be regarded as illustrative in nature, and not restrictive of the scope of the appended claims and equivalents thereof.

We claim:

1. A molded article in the form of tongs for handling food, said article comprising:
    a common fulcrum end;
    first and second arms extending from said common fulcrum end and terminating in respective first and second grasping ends, said first and second grasping ends being disposed in a mutually opposing and normally spaced-apart relationship, said first and second grasping ends being relatively moveable to a closed position for grasping food therebetween; and
    a reinforcing member disposed between said first and second arms proximate said fulcrum end, said reinforcing member connected by a transverse component to said first and second arms and by a longitudinal rib to said fulcrum end, and there being at least one opening disposed on each side of said longitudinal rib.

2. The molded article according to claim 1, wherein said reinforcing member extends from said fulcrum end to said first and second arms with a continuous line of connection for at least 10 percent of the length of said molded article.

3. The molded article according to claim 1, wherein said reinforcing member comprises a plurality of openings disposed on each side of said longitudinal rib.

4. The molded article according to claim 1, wherein said fulcrum end incorporates a tab protruding therefrom in a direction perpendicular to a common plane of said molded article, said common plane intersecting said first and second arms, said first and second grasping ends, said fulcrum end and said reinforcing member, said tab being configured for catching the rim of an open top container when positioned thereagainst; said tab being adapted to prevent said article from sliding into the container.

5. The molded article according to claim 1, wherein said first and second grasping ends are disposable inside an open top container, and wherein said fulcrum end incorporates a tab protruding from an edge thereof, said tab being configured for supporting said molded article against the rim of said open top container and preventing said molded article from sliding into said open top container.

6. The molded article according to claim 1, wherein said first and second arms each comprise at least one tab protruding therefrom in a direction perpendicular to a common plane of said molded article, configured for catching the rim of an open top container when positioned thereagainst thereby preventing said article from sliding into the container.

7. The molded article according to claim 1, wherein a thin metallic coating is deposited on said molded article by a vacuum deposition process, said thin metallic coating being of sufficient thickness to impart a reflective metal like appearance to said molded article.

8. The molded article according to claim 7, wherein said thin metallic coating is steel.

9. The molded article according to claim 7, wherein said thin metallic coating is stainless steel.

10. The molded article according to claim 7, wherein said thin metallic coating is titanium nitride.

11. The molded article of claim 1, wherein said first and second arms, said transverse component, and said longitudinal rib all have a common, substantially uniform width in a direction perpendicular to a common plane of said molded article.

12. A molded article in the form of food tongs for handling food items, said article comprising:
    a first arm and a second arm; said first and second arms being joined together at a fulcrum end;
    said first arm having a first grasping end;
    said second arm having a second grasping end;
    said first and second grasping ends of respective said first and second arms being disposed in a mutually opposing and spaced-apart relationship and being relatively moveable to a closed position for grasping food therebetween;

a transverse bridge disposed proximate to said fulcrum end and extending from said first arm to said second arm;

a longitudinal rib extending between said fulcrum end and said transverse bridge; and an opening disposed on each side of said longitudinal rib.

13. The molded article according to claim 12, wherein said first and second arms respectively comprise a first tab and a second tab extending therefrom in a direction perpendicular to a common plane of the article, said common plane of the article intersecting said first and second arms, said fulcrum end and said first and second grasping ends, said first and second tabs being configured for preventing said molded article from sliding into an open top container when positioned against a rim thereof.

14. The molded article according to claim 12, wherein said fulcrum end comprises at least one tab protruding therefrom in a direction perpendicular to a common plane of the article, said tab configured for preventing said molded article from sliding into an open top container when positioned against a rim thereof.

15. The molded article according to claim 12, wherein a thin metallic coating is deposited on said molded article by a vacuum deposition process, said thin metallic coating being of sufficient thickness to impart a reflective metal like appearance to said molded article.

16. The molded article according to claim 15, wherein said thin metallic coating is steel.

17. The molded article according to claim 15, wherein said thin metallic coating is stainless steel.

18. The molded article according to claim 15, wherein said thin metallic coating is titanium nitride.

19. The molded article according to claim 12, wherein there is a plurality of openings disposed on each side of said longitudinal rib.

20. The molded article of claim 12, wherein said first and second arms, said transverse bridge, and said longitudinal rib all have a common, substantially uniform width in a direction perpendicular to a common plane of said molded article.

* * * * *